US006775620B1

(12) United States Patent
Baker, III

(10) Patent No.: US 6,775,620 B1
(45) Date of Patent: Aug. 10, 2004

(54) METHOD OF LOCATING A SURFACE IN A THREE DIMENSIONAL VOLUME OF SEISMIC DATA

(75) Inventor: Robert Allison Baker, III, Stafford, TX (US)

(73) Assignee: Seismic Micro-Technology, Inc., Houston, TX (US)

(*) Notice: Subject to any disclaimer, the term of this patent is extended or adjusted under 35 U.S.C. 154(b) by 0 days.

(21) Appl. No.: 10/417,449

(22) Filed: Apr. 16, 2003

(51) Int. Cl.[7] ................................................. G01V 1/28
(52) U.S. Cl. ......................................................... 702/16
(58) Field of Search .............................. 702/14, 16, 17; 367/73, 72

(56) References Cited

U.S. PATENT DOCUMENTS 5,724,309 A * 3/1998 Higgs et al. .................. 367/48

6,278,949 B1 * 8/2001 Alam ........................... 702/16

OTHER PUBLICATIONS

Dorn, Geoffrey A., "Modern 3–D seismic interpretation," ARCO Exploration and Production Technology.

Herron, Donald A., "Horizon autopicking," The Leading Edge, 491–492, May 2000.

* cited by examiner

Primary Examiner—Donald McElheny, Jr.
(74) Attorney, Agent, or Firm—Duane Morris LLP

(57) ABSTRACT

The method of the present invention relates to the field of seismic data interpretation for the purpose of locating a surface in a three dimensional volume of seismic data. The present invention applies mathematical gridding to the location of surfaces in a volume.

20 Claims, 8 Drawing Sheets

METHOD OF LOCATING A SURFACE IN A THREE DIMENSIONAL VOLUME OF SEISMIC DATA

BACKGROUND OF THE INVENTION

1. Field of the Invention

The method of the present invention relates to the field of seismic data interpretation for the purpose of locating a surface in a three dimensional volume of seismic data. The present invention applies mathematical gridding to the location of surfaces in a volume.

2. Description of the Prior Art

In the field of oil and gas exploration, locating surfaces within a seismic volume is essential for deciding where exploratory wells are to be drilled and for understanding the geologic history of the rock represented by the seismic volume. Interpreters in the oil and gas industry typically spend months locating and marking surfaces in such a volume. The process of marking the locating and marking surfaces in a seismic volume is called "seismic interpretation," and an "interpreter" is one who does this job. "Interpreting" is also known as "picking," and the "picks" are typically referred to as "horizons."

Subsurface rocks are generally porous, like beach sand but with less ability to absorb fluids, and contain either water, oil, or gas. Oil and gas are lighter than water and float upward in the subsurface as they do at the surface. The path of movement and the cessation of movement are in large part dependent on the geometry of the subsurface layers in which the fluids move, which makes the location of surfaces in seismic data of interest to interpreters.

In addition to defining the geometric relationships of the surfaces, seismic data may reveal the location of ancient seabeds, streams, reefs, and other features where organic matter may accumulate to become oil or gas or where oil or gas may be trapped. Such information has great utility in geophysical exploration for hydrocarbons.

Oil and gas are for the most part found thousands of feet below the surface of the Earth. Determining where oil and gas form and accumulate requires understanding features seen at these depths. Much of what exists currently at depth was once at the Earth's surface, either at the dry land surface or at the seabed or below some other body of water. Understanding these buried surfaces begins with obtaining their shapes and relating the shapes to one another.

Much of the search for hydrocarbons is conducted using seismic data. Seismic data are produced by transmitting an acoustic signal (generated by dynamite, for example) into the Earth and recording echoes of this signal. The layers of rock within the Earth differ in their acoustic properties, and these changes in property produce echoes of the seismic signal. The reflecting surfaces generally mimic the surface of the Earth at some time in the past, so it is the mapping of these surfaces that occupies a significant portion of the exploration process.

FIG. 1 depicts a typical seismic echo as detected by a receiver at the Earth's surface. It is a sinusoidal curve as a function of time. The strength of the echo rises and falls over a period of several seconds, and this rise and fall is recorded in digital form or converted to digital form for processing and analysis. A single echo train is usually called a "seismic trace".

The echo train consists of amplitude characteristics of interest such as "peaks" and "troughs". Peaks, by convention, deflect to the right and are black-filled in this display. Troughs deflect to the left and are not filled in this display; only the "trace", or single line, of the deflection is present for troughs. The trace crosses the zero-amplitude line where the black fill of the peaks form a vertical boundary. The points of crossing are called "zero crossings". Zero crossings are another example of amplitude characteristics of interest. Some zero crossings transition from peaks to troughs and others transition from troughs to peaks. In a general way each peak and trough represents a reflecting boundary, so that each trace provides a view of the subsurface at its location.

When such traces are collected along a line on the surface, an image such as shown in FIG. 2 can be created. A collection such as is represented by FIG. 2 is called a "seismic section" or a "section" because it is a cross-section through the Earth as represented by seismic traces. One can clearly see that there is a pattern to the reflection surfaces along this section. Peaks and troughs line up laterally in an organized way.

The interpreter's job is to decide which peaks or which troughs are to be tracked laterally and then to make a record of the tracking by picking horizons. Sometimes peaks change to troughs laterally, and it is the interpreter's job to decide whether such a change means the event has terminated, or has shifted up or down, or continues as the reversed feature. Such transitions can be gradual, and the interpreter must decide where the event is on the other side of the transition. Sometimes zero crossings are to be tracked. In the usual case the event of interest does not transition to its opposite, but the fading and re-emergence of an event can be common.

Prior art patents in the field of seismic data interpretation disclose methods for searching or interpolating from one seismic trace to adjacent seismic traces. Such methods are disclosed in U.S. Pat. Nos. 5,153,858 and 5,432,751 to Hildebrand; U.S. Pat. Nos. 5,251,184 and 5,615,171 to Hildebrand et al.; and U.S. Pat. No. 5,056,066 to Howard. These prior art patents do not disclose a method that employs a mathematical surface for locating a surface in a three dimensional volume of data.

SUMMARY OF THE INVENTION

The present invention is directed toward a method of locating a surface in a three dimensional volume of seismic data. In the present invention, an acoustic signal is transmitted into the Earth to produce a multiplicity of reflected acoustic signals that are received by at least three non-colinear receivers. These receivers define a grid having an x axis dimension and y axis dimension. Amplitude values of each reflected acoustics signal are recorded as a function of time to construct a seismic volume comprising a seismic trace for each recorded acoustic signal. The seismic volume comprises a z axis dimension that measures the time of each reflected acoustic signal.

The present invention is directed toward a method of calculating a set of great coordinates of the type $m_i=(x_i, y_i, t_i)$, based upon the location of an amplitude characteristic of interest.

The present invention permits the use of algorithms known to those of ordinary skill in the art to define a mathematical surface from the data in the seismic volume. The defined mathematical surface is then used to autopick additional data points needed to locate a surface of interest in the seismic volume.

DESCRIPTION OF THE PREFERRED EMBODIMENT

Figure 5A:
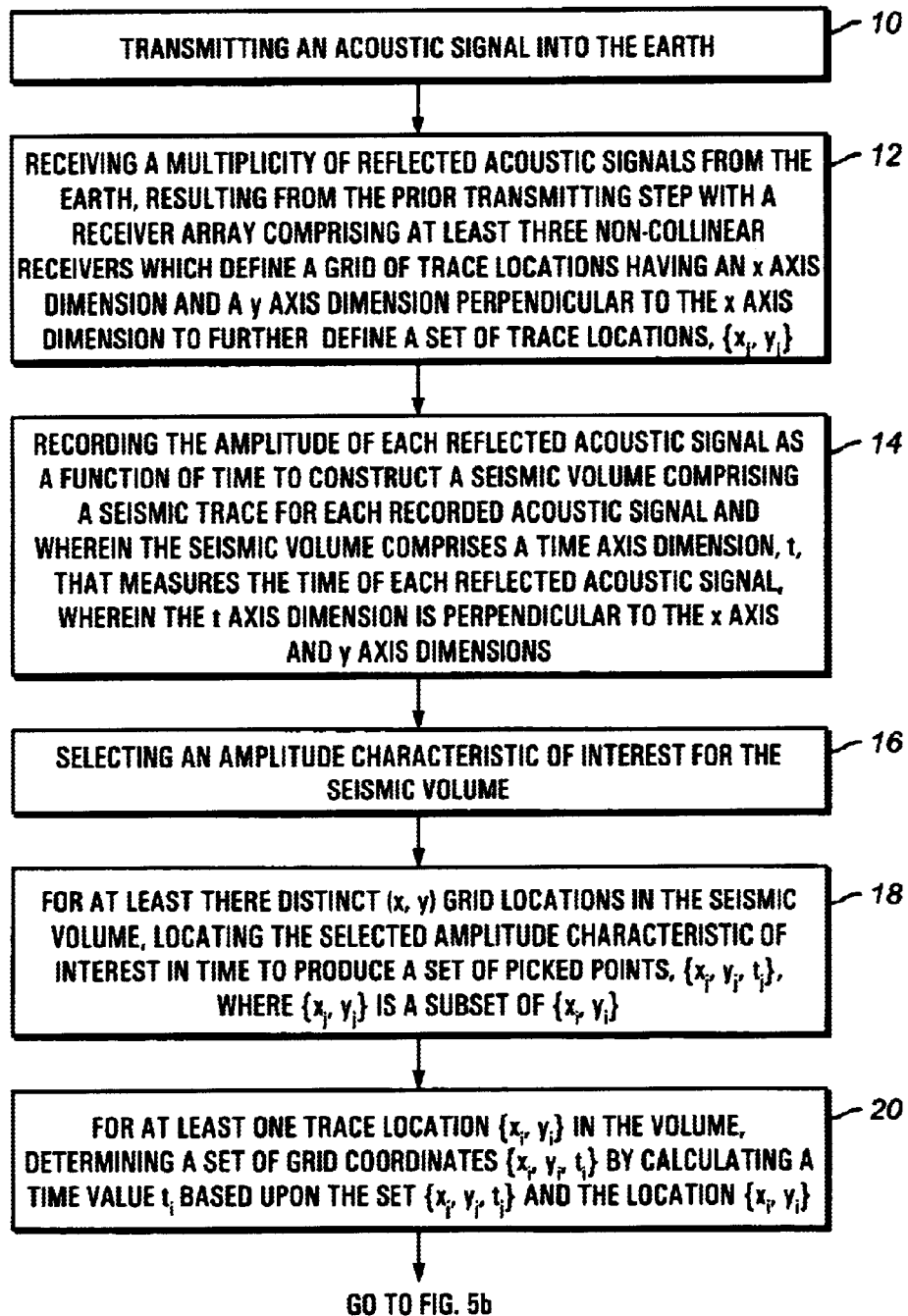
FIGS. 5a–5b are block diagrams of a preferred embodiment of the present invention.

The present invention is directed toward a method of locating a surface in a three dimensional volume of data indicative of surface characteristics, The method comprises transmitting an acoustic signal into the Earth, as shown block 10 of FIG. 5a. The invention further comprises receiving a multiplicity of reflected acoustic signals from the Earth resulting from the transmitting of acoustic signals into the Earth, as shown in block 12 of FIG. 5a. A receiver array comprising at least three non-colinear receivers is used to receive the multiplicity of reflected acoustic signals. This array defines a grid having an x axis dimension and a y axis dimension perpendicular to the x axis dimension to further define a set of trace locations $\{x_i, y_i\}$.

Figure 1:
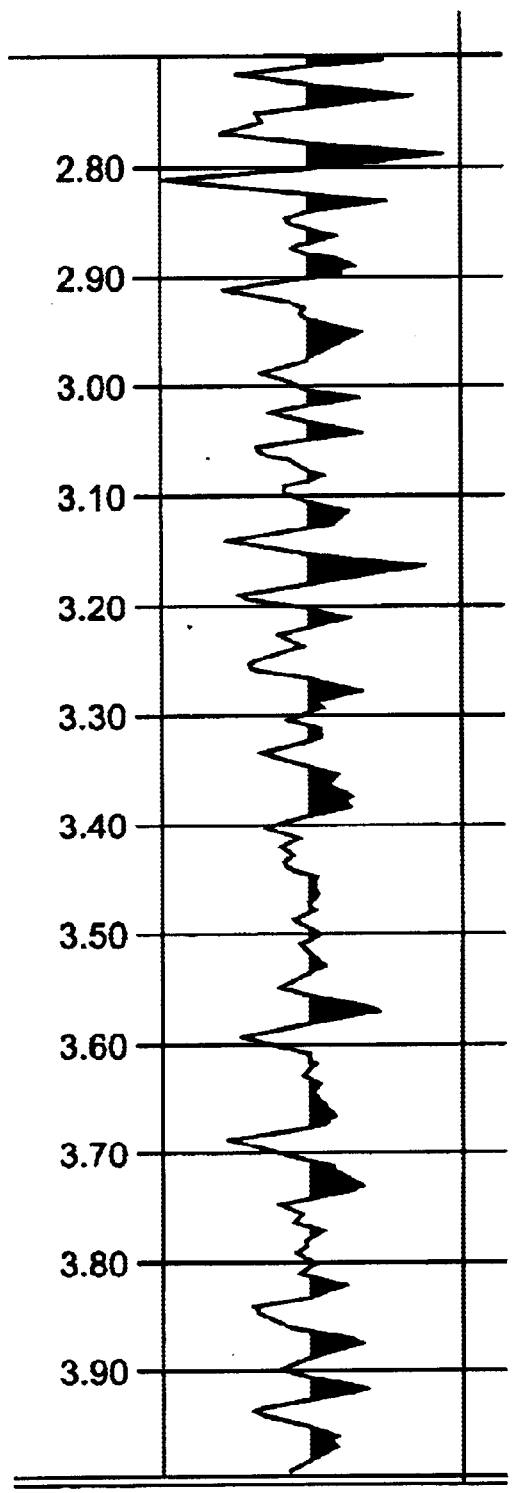
FIG. 1 is a temporal trace of a seismic echo depicting time on the vertical axis and amplitude on the horizontal axis.
Figure 2:
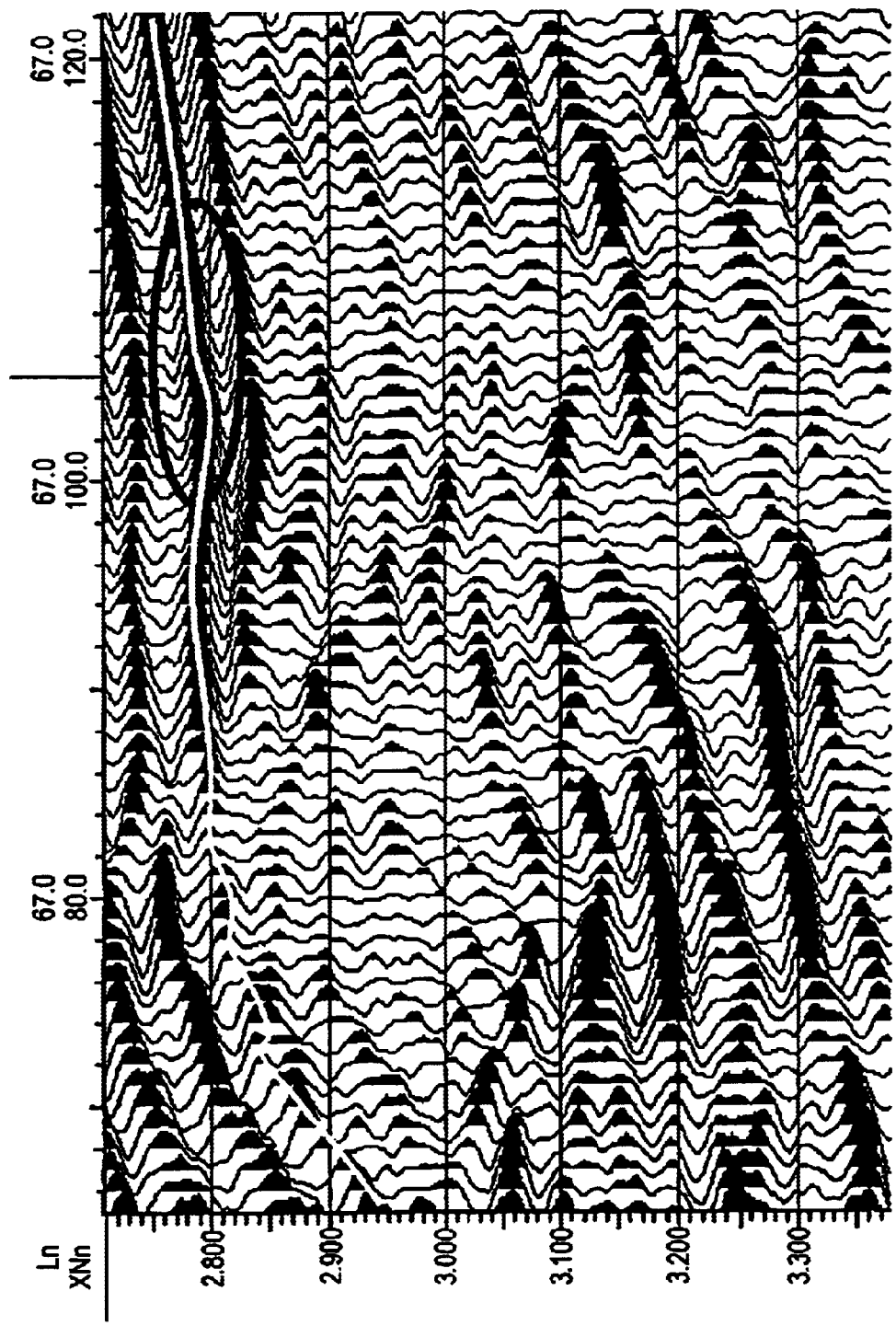
FIG. 2 is a plot of adjacent seismic traces of the type shown in FIG. 1.
Figure 3:
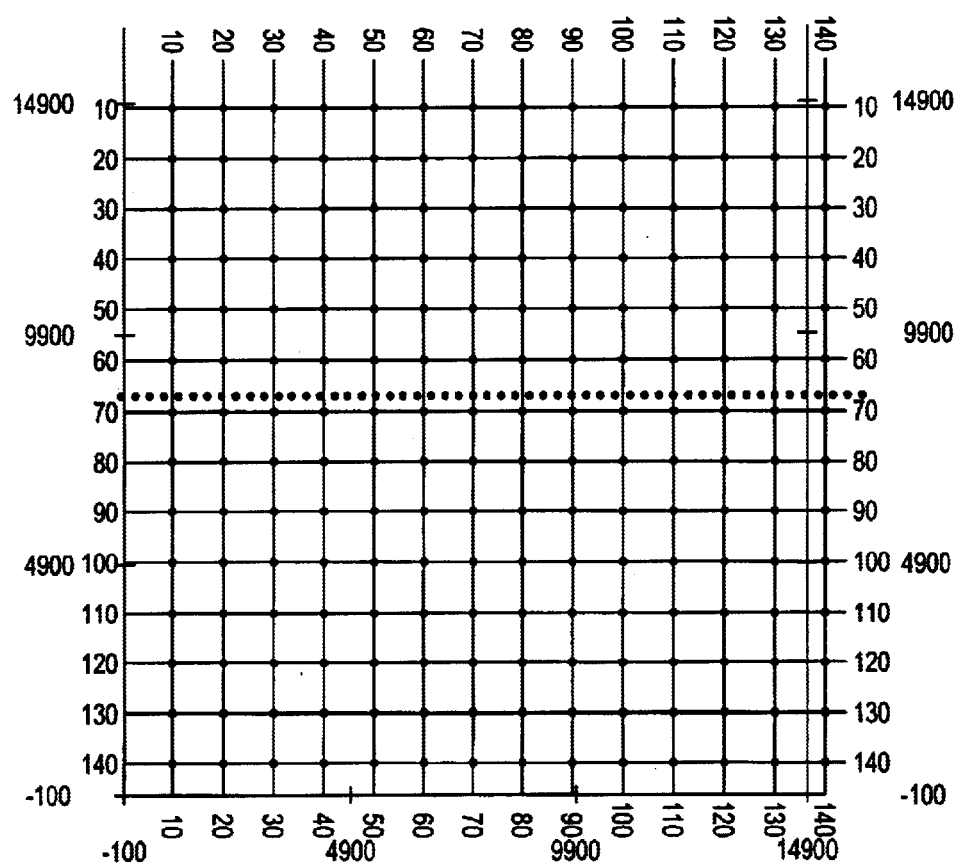
FIG. 3 is a grid depiction of seismic data in map view.
Figure 4A:
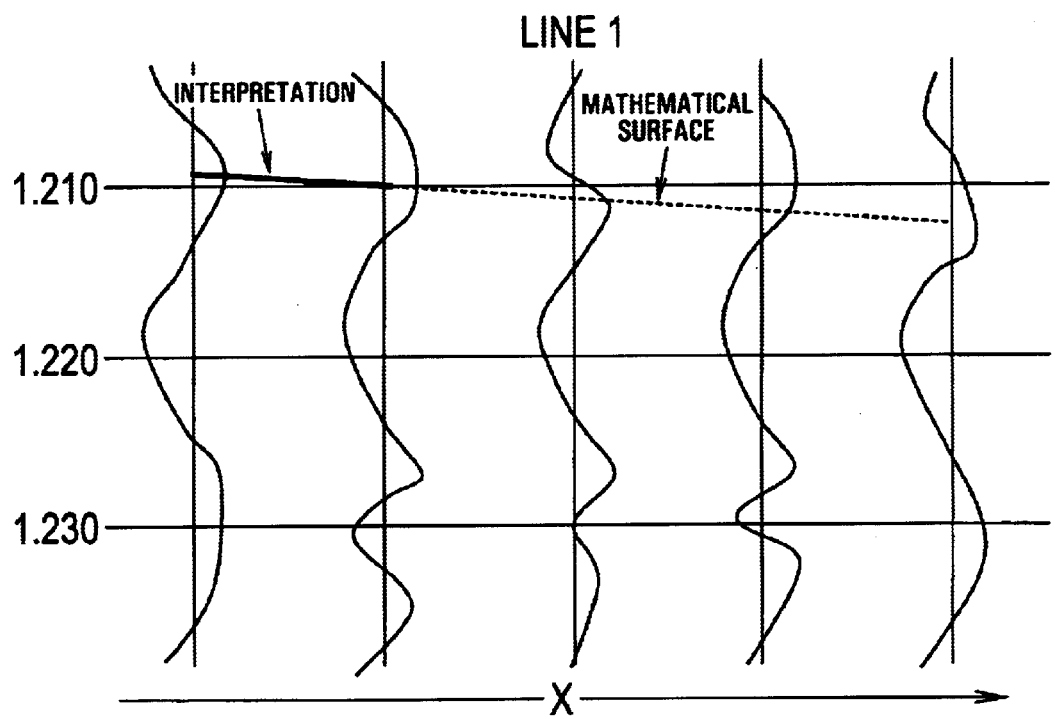
FIGS. 4a–4e are a graphic depiction of an autopicking method suitable for use in practicing the present invention.

A grid is illustrated in FIG. 3. A first line of seismic data in the x axis dimension is illustrated in FIG. 4a.

The invention further comprises recording the amplitude of each reflected acoustic signal as a function of time to construct a seismic volume comprising a seismic trace for each recorded acoustic signal, as shown in block 14 of FIG. 5a. The seismic volume comprises a time axis dimension, t, that measures the time of each reflected acoustic signal. An amplitude characteristic of interest is then selected in the seismic volume, as shown in block 16 of FIG. 5a. The t axis dimension is perpendicular to the x axis and y axis dimensions. In various embodiments, the amplitude characteristic of interest is a peak, a trough, or a zero crossing.

The invention further comprises for at least three distinct (x, y) grid locations in the seismic volume, locating the selected amplitude characteristic of interest in time to produce a set of picked points, $\{x_j, y_j, t_j\}$, where $\{x_j, y_j\}$ is a subset of $\{x_i, y_i\}$, as shown in block 18 of FIG. 5a.

For at least one trace location $(x_i, y_i)$ in the volume, a set of grid coordinates $\{x_i, y_i, t_i\}$ is determined by calculating a time value $t_i$ based upon the set $\{x_j, y_j, t_j\}$ and the location(s) $\{x_i, y_i\}$, as shown in block 20 of FIG. 5a. In a preferred embodiment, determining a set of grid coordinates comprises selecting an initial grid location, selecting a calculation radius R, and restricting the set of grid locations to be within radius R of the initially selected grid location.

In a preferred embodiment, the step of determining a set of grid coordinates comprises selecting a grid location of interest, selecting a weighting function based upon the distance between a grid location of interest and the selected initial grid location, and using the weighting function to determine a set of grid coordinates. In a preferred embodiment, determining a set of grid coordinates comprises projecting a gradient from at least one recorded time $t_j$ in the seismic volume.

The invention comprises storing the set of coordinates $\{x_i, y_i, t_i\}$ calculated, in the step shown in block 20 of FIG. 5a. This storing step is shown in block 22 of FIG. 5b. The invention further comprises selecting a grid location $(x_i, y_i)$ in a first autopicking direction, as shown in block 24 of FIG. 5b.

Figure 5B:
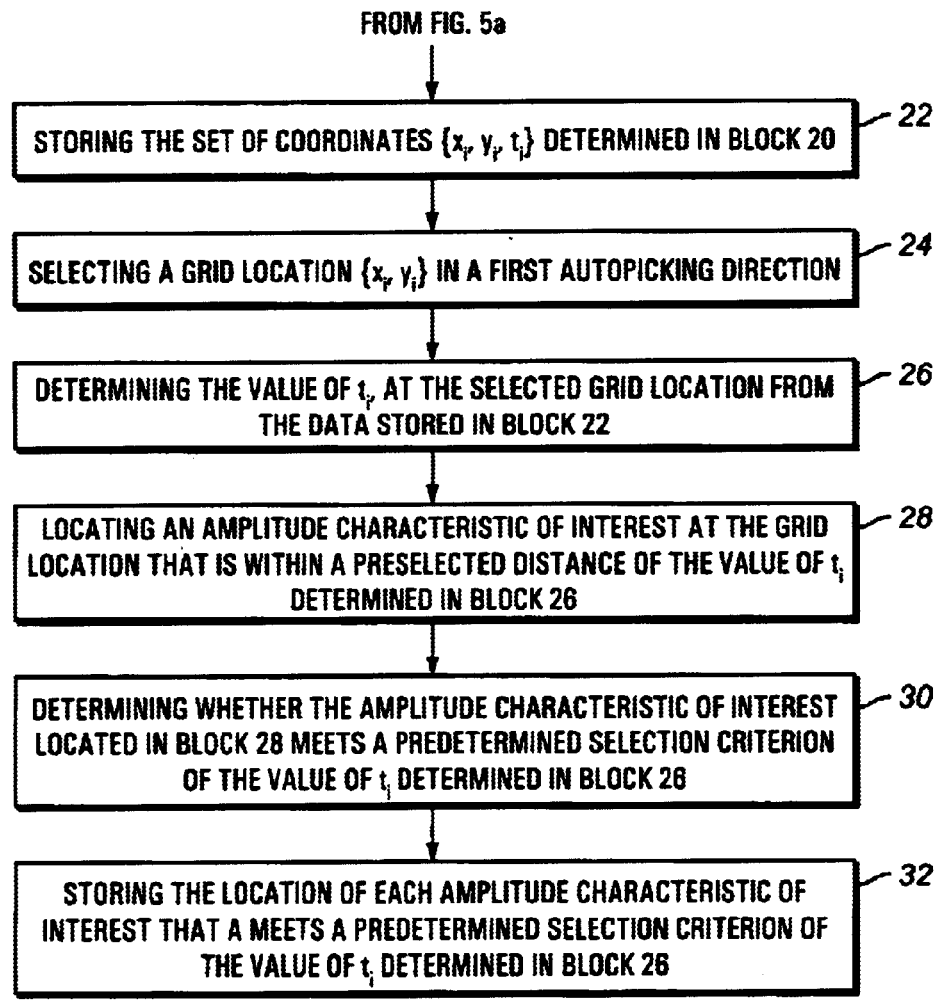

As shown in block 26 of FIG. 5b, the invention next comprises determining the value of ti at the selected grid location from the stored data, described in block 22 of FIG. 5b. The invention further comprises locating an amplitude characteristic of interest at the grid location that is within a preselected distance of the value of $t_i$ determined in the preceding step, as shown in block 28 of FIG. 5b. In various preferred embodiments, the amplitude characteristic of interest may be a peak, a trough, or a zero crossing.

The invention further comprises determining whether the amplitude characteristic of interest located in preceding step meets a predetermined selection criterion of the determined value of $t_i$ as shown in block 30 of FIG. 5b. The location of each amplitude characteristic of interest that meets a predetermined selection criterion of the previously described value $t_i$ is stored, as shown in block 32 of FIG. 5b.

In one preferred embodiment, the selection criterion is a maximum deviation of the location of the amplitude characteristic of interest from the grid time $t_i$. In an additional preferred embodiment, where the selection criterion is a maximum deviation of the location of the amplitude characteristic of interest from the grid type $t_i$, the deviation does not exceed a time measurement of one second the t axis.

In a preferred embodiment, where the receiving is performed with a N×M receiver array, N and M are at least 10. In another preferred embodiment where N and M are at least 10, N equals M. In another embodiment, N and M are least 100. In other embodiments, N does not equal M.

In a preferred embodiment, the invention further comprises plotting a surface comprising the stored amplitude characteristics of interests, as shown in block 36 of FIG. 5b.

An autopicking method suitable for use in practicing the present invention is shown in FIGS. 4a–4e. As shown in FIG. 4a, traces in the x and y direction are interpreted on peaks, as shown by the bold lines. The coordinates of the located peaks in the first 3 traces of FIG. 4a are (0,0,1.2093), (100,0,1.210), and (0,100,1.2117).

A mathematical surface fitting a plane through these three points predicts the time at any (x, y) coordinate. The time, T, can be calculated using the following equation which was derived algebraically from the three data points:

$$T = 1.2093 + 0.0000007x + 0.000024y \tag{1}$$

Figure 4B:
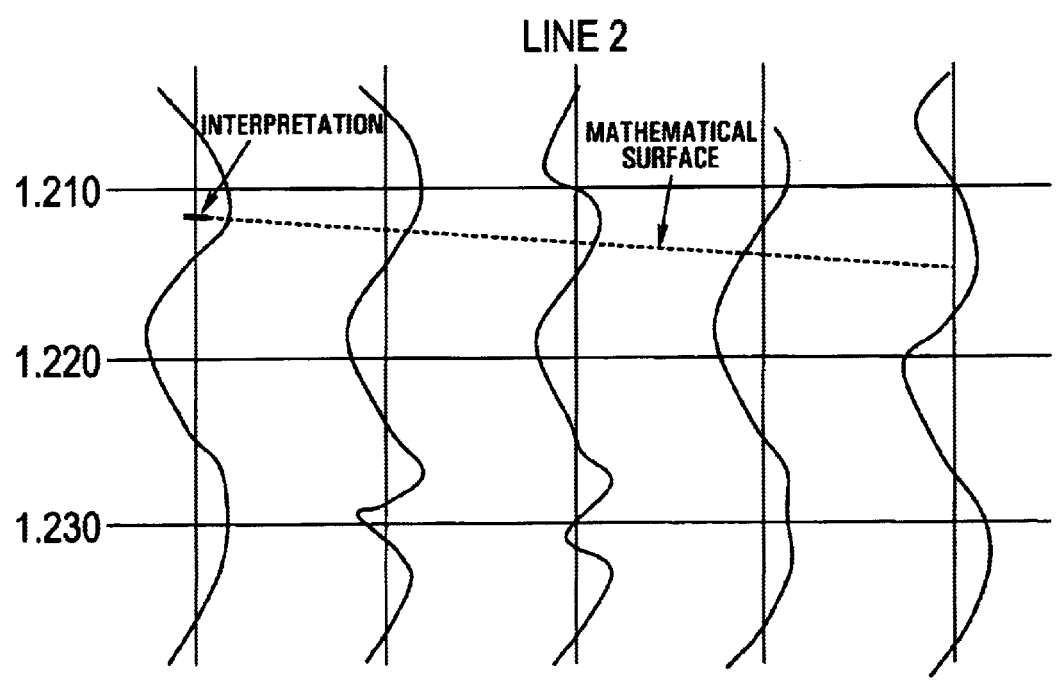

The use of this method for interpolation is illustrated in FIG. 4b. The dashed line shown in FIG. 4c predicts the surface at each trace. The predicted coordinates at the far corners of the survey, computed from the above equation, are: (400,0,1.2121), (400,400,1.2217), and (0,400,1.2189).

Figure 4C:
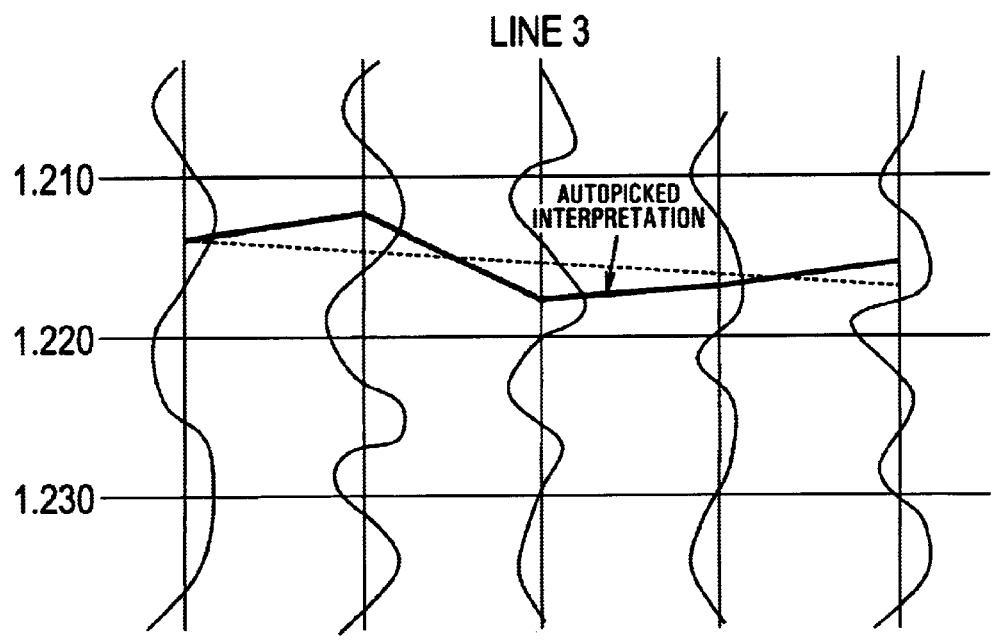
Figure 4D:
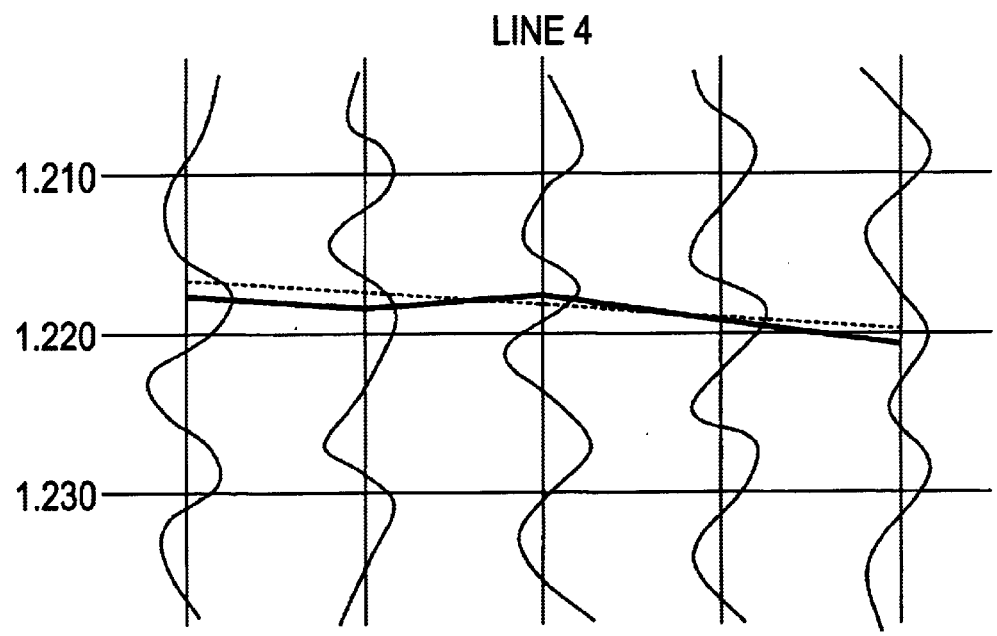
Figure 4E:
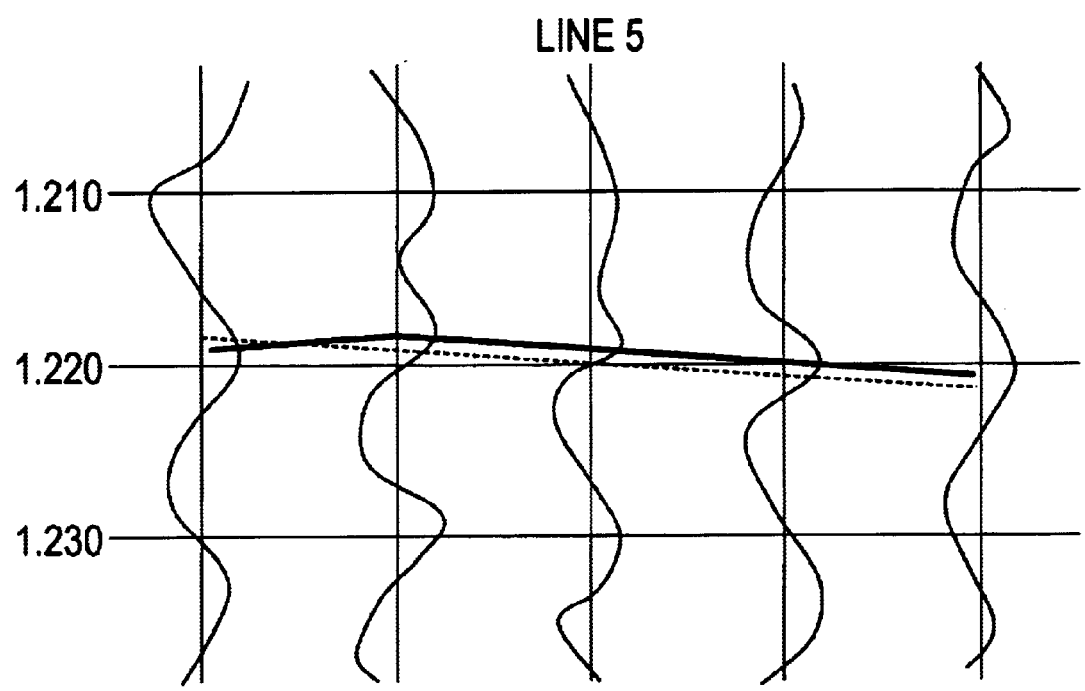

One practicing the autopicking method of the present invention selects peaks near the mathematical surface rather than moving from trace to trace. The selection of peaks near the mathematical surface is illustrated in FIGS. 4c–4e.

The foregoing disclosure and description of the invention are illustrative and explanatory. Various changes in the size, shape, and materials, as well as in the details of the illustrative construction may be made without departing from the spirit of the invention.

What is claimed is:

1. A method of locating a surface in a three dimensional volume of data indicative of surface characteristics, comprising:

a. transmitting an acoustic signal into the earth;
   b. receiving a multiplicity of reflected acoustic signals from the earth, resulting from the prior transmitting step with a receiver array comprising at least three non-colinear receivers which define a grid of trace locations having an x axis dimension and a y axis dimension perpendicular to the x axis dimension to further define a set of trace locations, $\{x_i, y_i\}$;

c. recording the amplitude of each reflected acoustic signal as a function of time to construct a seismic volume comprising a seismic trace for each recorded acoustic signal and wherein the seismic volume comprises a time axis dimension, t, that measures the time of each reflected acoustic signal, wherein the t axis dimension is perpendicular to the x axis and y axis dimensions;

d. selecting an amplitude characteristic of interest for the seismic volume;

e. for at least three distinct (x, y) grid locations in the seismic volume, locating the selected amplitude characteristic of interest in time to produce a set of picked points, $\{x_j, y_j, t_j\}$, where $\{x_j, y_j\}$ is a subset of $\{x_i, y_i\}$;

f. for at least one trace location $(x_i, y_i)$ in the volume, determining a set of grid coordinates $\{x_i, y_i, t_i\}$ by calculating a time value $t_i$ based upon the set $\{x_j, y_j, t_j\}$ and the location $(x_i, y_i)$;

g. storing the set of coordinates $\{x_i, y_i, t_i\}$ determined in step (f);

h. selecting a grid location $(x_i, y_i)$ in a first autopicking direction;

i. determining the value of $t_i$ at the selected grid location from the data stored in step (g);

j. locating an amplitude characteristic of interest at the grid location that is within a preselected distance of the value of $t_i$ determined in step (i);

k. determining whether the amplitude characteristic of interest located in step (j) meets a predetermined selection criterion of the value of $t_i$ determined in step (i); and l. storing the location of each amplitude characteristic of interest that meets a predetermined selection criterion of the value of $t_i$ determined in step (i).

2. The method of claim 1, where the amplitude characteristic of interest is a peak.

3. The method of claim 1, where the amplitude characteristic of interest is a trough.

4. The method of claim 1, where the amplitude characteristic of interest is a zero crossing.

5. The method of claim 1, where the predetermined selection criterion is a maximum deviation of the location of the amplitude characteristic of interest from the grid time $t_i$.

6. The method of claim 5, where the deviation does not exceed a time measurement of one second on the t axis.

7. The method of claim 1, where the receiving is performed with an N×M receiver array where N and M are at least 10.

8. The method of claim 7, where N=M.

9. The method of claim 1, where the receiving is performed with an N×M receiver array where N and M are at least 100.

10. The method of claim 9, where N does not equal M.

11. The method of claim 1, where determining a set of grid coordinates comprises:
   a. selecting an initial grid location;
   b. selecting a calculation radius, R; and
   c. restricting the set of grid locations to be within radius R of the initially selected grid location.

12. The method of claim 1, where determining a set of grid coordinates comprises:
   a. selecting a grid location of interest;
   b. selecting a weighting function based upon the distance between a grid location of interest and the selected initial grid location; and
   c. using the weighting function to determine a set of grid coordinates.

13. The method of claim 1, where determining a set of grid coordinates comprises projecting a gradient from at least one recorded time $t_j$ in the seismic volume.

14. The method of claim 1, further comprising plotting a surface comprising the stored amplitude characteristics of interest.

15. A method of locating a surface in a three dimensional volume of data indicative of surface characteristics, comprising:

a. transmitting an acoustic signal into the earth;

b. receiving a multiplicity of reflected acoustic signals from the earth, resulting from the prior transmitting step with an N×M receiver array comprising at least four non-colinear receivers which define a grid of trace locations having an x axis dimension and a y axis dimension perpendicular to the x axis dimension to further define a set of trace locations, $\{x_i, y_i\}$;

c. recording the amplitude of each reflected acoustic signal as a function of time to construct a seismic volume comprising a seismic trace for each recorded acoustic signal and wherein the seismic volume comprises a time axis dimension, t, that measures the time of each reflected acoustic signal, wherein the t axis dimension is perpendicular to the x axis and y axis dimensions;

d. selecting an amplitude characteristic of interest for the seismic volume;

e. for at least three distinct (x, y) grid locations in the seismic volume, locating the selected amplitude characteristic of interest in time to produce a set of picked points, $\{x_j, y_j, t_j\}$, where $\{x_j, y_j\}$ is a subset $\{x_i, y_i\}$;

f. for at least one trace location $(x_i, y_i)$ in the volume, determining a set of grid coordinates $\{x_i, y_i, t_i\}$ by calculating a time value $t_i$ based upon the set $\{x_j, y_j, t_j\}$ and the location $(x_i, y_i)$;

g. storing the set of coordinates $\{x_i, y_i, t_i\}$ determined in step (f);

h. selecting a grid location $(x_i, y_i)$ in a first autopicking direction;

i. determining the value of $t_i$ at the selected grid location from the data stored in step (g);

j. locating an amplitude characteristic of interest at the grid location that is within a preselected distance of the value of $t_i$ determined in step (i);

k. determining whether the amplitude characteristic of interest located in step (j) meets a predetermined selection criterion of the value of $t_i$ determined in step (i); and l. storing the location of each amplitude characteristic of interest that meets a predetermined selection criterion of the value of $t_i$ determined in step (i).

16. The method of claim 15, where the amplitude characteristic of interest is a peak.

17. The method of claim 15, where N does not equal M.

18. A method of locating a surface in a three dimensional volume of data indicative of surface characteristics, comprising:

a. transmitting an acoustic signal into the earth;

b. receiving a multiplicity of reflected acoustic signals from the earth, resulting from the prior transmitting step with a receiver array comprising at least three non-colinear receivers which define a grid of trace locations having an x axis dimension and a y axis dimension perpendicular to the x axis dimension to further define a set of trace locations, $\{x_i, y_i\}$;

c. recording the amplitude of each reflected acoustic signal as a function of time to construct a seismic volume comprising a seismic trace for each recorded acoustic signal and wherein the seismic volume comprises a time axis dimension, t, that measures the time of each reflected acoustic signal, wherein the t axis dimension is perpendicular to the x axis and y axis dimensions;

d. selecting an amplitude characteristic of interest for the seismic volume from the group consisting of a peak, a trough and a zero crossing;

e. for at least three distinct (x, y) grid locations in the seismic volume, locating the selected amplitude characteristic of interest in time to produce a set of picked points, $\{x_j, y_j, t_j\}$, where $\{x_j, y_j\}$ is a subset $\{x_i, y_i\}$;

f. for at least one trace location $(x_i, y_i)$ in the volume, determining a set of grid coordinates $\{x_i, y_i, t_i\}$ by calculating a time value $t_i$ based upon the set $\{x_j, y_j, t_j\}$ and the location $(x_i, y_i)$;

g. storing the set of coordinates $\{x_i, y_i, t_i\}$ calculated in step (f);

h. selecting a grid location $(x_i, y_i)$ in a first autopicking direction;

i. determining the value of $t_i$ at the selected grid location from the data stored in step (f);

j. locating an amplitude characteristic of interest at the grid location that is within a preselected distance of the value of $t_i$ determined in step (i);

k. determining whether the amplitude characteristic of interest located in step (j) meets a predetermined selection criterion of the value of $t_i$ determined in step (i);

l. storing the location of each amplitude characteristic of interest that meets a predetermined selection criterion of the value of $t_i$ determined in step (i); and m. plotting a surface comprising the stored amplitude characteristics of interest.

19. The method of claim 18, where the preselected selection criterion is a tolerance.

20. The method of claim 19, where the tolerance does not exceed a time measurement of one second on the t axis.

* * * * *